(12) United States Patent
Palazzo et al.

(10) Patent No.: US 8,474,662 B2
(45) Date of Patent: Jul. 2, 2013

(54) FRESH COOKING OIL AUTOMATED DISPENSING RACK

(75) Inventors: John W. Palazzo, Barberton, OH (US); Giovanni Brienza, Fairlawn, OH (US)

(73) Assignee: Frontline International, Inc., Cuyahoga Falls, OH (US)

( * ) Notice: Subject to any disclaimer, the term of this patent is extended or adjusted under 35 U.S.C. 154(b) by 597 days.

(21) Appl. No.: 12/697,502

(22) Filed: Feb. 1, 2010

(65) Prior Publication Data
US 2011/0186592 A1 Aug. 4, 2011

(51) Int. Cl.
*B67D 7/06* (2010.01)
*A47F 1/04* (2006.01)

(52) U.S. Cl.
USPC .............. 222/180; 211/59.2; 222/23

(58) Field of Classification Search
USPC ............ 222/180, 164, 510, 519, 95, 136, 222/23, 66, 185.1, 478, 479; 220/495.05, 220/373; 211/59.2
See application file for complete search history.

(56) References Cited

U.S. PATENT DOCUMENTS

| | | | | |
|---|---|---|---|---|
| 297,058 | A * | 4/1884 | Best | 137/124 |
| 4,148,729 | A * | 4/1979 | Howard | 210/104 |
| 4,484,697 | A * | 11/1984 | Fry, Jr. | 222/95 |
| 4,627,542 | A * | 12/1986 | Fredrickson | 211/150 |
| 4,646,793 | A * | 3/1987 | Sherratt | 141/1 |
| 5,647,511 | A * | 7/1997 | Bond | 222/105 |
| 6,041,802 | A | 3/2000 | Nelson | |
| 6,834,768 | B2 * | 12/2004 | Jersey et al. | 211/189 |
| 6,981,531 | B1 * | 1/2006 | Palazzo | 141/95 |
| 7,159,742 | B2 * | 1/2007 | Lee | 222/92 |
| 7,735,526 | B2 * | 6/2010 | Palazzo | 141/1 |
| 7,959,026 | B2 * | 6/2011 | Bertani | 220/373 |
| 2004/0256341 | A1 * | 12/2004 | Donnell et al. | 211/187 |
| 2006/0011640 | A1 * | 1/2006 | Shaygan | 220/745 |
| 2007/0056250 | A1 * | 3/2007 | Waldron | 53/432 |
| 2007/0227597 | A1 * | 10/2007 | Palazzo | 137/565.01 |
| 2008/0277412 | A1 * | 11/2008 | Palazzo | 222/63 |
| 2010/0044386 | A1 * | 2/2010 | Samson | 220/719 |

* cited by examiner

*Primary Examiner* — Kevin P Shaver
*Assistant Examiner* — Patrick M Buechner
(74) *Attorney, Agent, or Firm* — Buckingham, Doolittle & Burroughs, LLP

(57) ABSTRACT

An architecture is presented that dispenses fresh cooking oil. The dispensing device comprises a rack and a vacuum chamber that secures containers of cooking oil in an inverted position. The vacuum chamber allows the cooking oil to drain out of the container and ensures that all oil is completely drained from the container. A metal cap assembly is secured to an opening of the container, allowing the container to be inverted on the rack. The metal cap assembly comprises a vent hole and a metal tube connected to the vent hole that draws air into the inverted container to prevent vacuum levels from building up in the container. A hose transfers cooking oil from the container to the vacuum chamber. And, an exit hose connects to a pumping station and transfers cooking oil from the vacuum chamber to the pumping station and ultimately to a fryer.

8 Claims, 7 Drawing Sheets

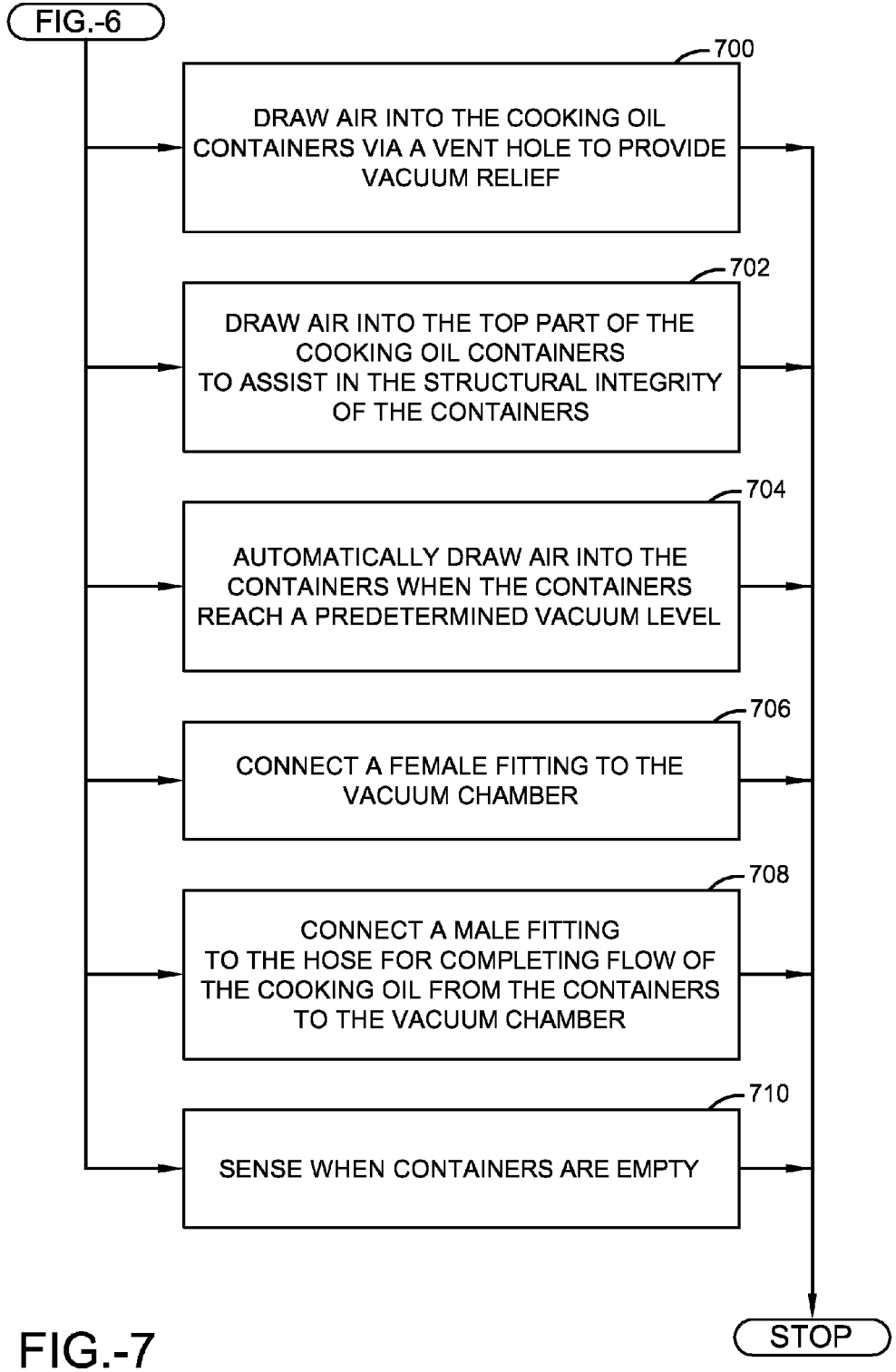

FRESH COOKING OIL AUTOMATED DISPENSING RACK

BACKGROUND

Health and safety issues along with finding ways to reduce costs of labor and food are ongoing efforts for every restaurant across the world. One area that always has high safety and cost concerns in any restaurant that fries food is a fryer. Much has been done to automate the handling and methodologies of getting used cooking oil from the fryer into a sealed storage bin, but there are few options available to automate and enhance the handling of fresh cooking oil.

Previous methodologies teach how to automate the handling of fresh cooking oil, but only in bulk. This option is limited by equipment, oil selection, geographical reach of the bulk oil company and associated inventions to dispense it. Accordingly, the standard for most restaurants is using 35 lb. boxes of oil. This allows every restaurant to select the exact oil specification it requires and have it delivered with normal distribution.

However, the safety issues and waste with boxed oil are numerous in a restaurant. For example, when a fryer becomes low on oil, a full box of oil or multiple boxes must be obtained from a back storage area, carried to the frying station, opened and gently poured into a fryer with 400 F. hot oil already in it. Not only is there a concern with carrying and slipping with a 35 lb. box of oil but the potential for a burn accident is very probable. Further, filling a fryer requires opening the cap, picking up the box, and gently pouring the container into the fryer. It is an awkward operation and causes oil to splatter whether the fryer is hot or cold. In addition, since there is a plastic container holding the oil, the amount of oil residue can be very high because a typical worker does not want to stand over the fryer, waiting for the oil residue to trickle down the sides of the container and completely emptying it out. On average every box of oil used in a restaurant has at least 1 lb. of oil left in the container as residue. Accordingly, an automated system for dispensing fresh cooking oil would give a user numerous safety and cost savings.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a fresh cooking oil dispensing device. The dispensing device comprises a rack and a vacuum chamber that holds multiple containers of cooking oil in an inverted position. The vacuum chamber allows the cooking oil to drain out of the container and ensures that all oil is completely drained from the container.

Furthermore, once a container is opened, a metal cap assembly is secured to the opening of the container, allowing the container to be inverted on the rack. The metal cap assembly comprises a vent hole that allows for air to enter the container of cooking oil and ensures all oil will drain out of the container. A metal tube is then connected to the vent hole in the metal cap assembly. The tube allows for air to enter the top part of the inverted container to prevent vacuum levels from building up in the container and assists in the structural integrity of the container. A pressure relief device, connected to the metal tube, allows air to enter automatically when the container reaches a predetermined vacuum level.

Further, a hose or pipe connects to the metal cap for transferring cooking oil from the container to the vacuum chamber in the rack. And, an exit hose connects to a pumping station and allows for the flow of cooking oil out of the containers. The exit hose transfers cooking oil from the vacuum chamber to the pumping station and ultimately to a fryer.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 7 illustrates further aspects in the dispensing method of FIG. 6.

DETAILED DESCRIPTION

Figure 1:
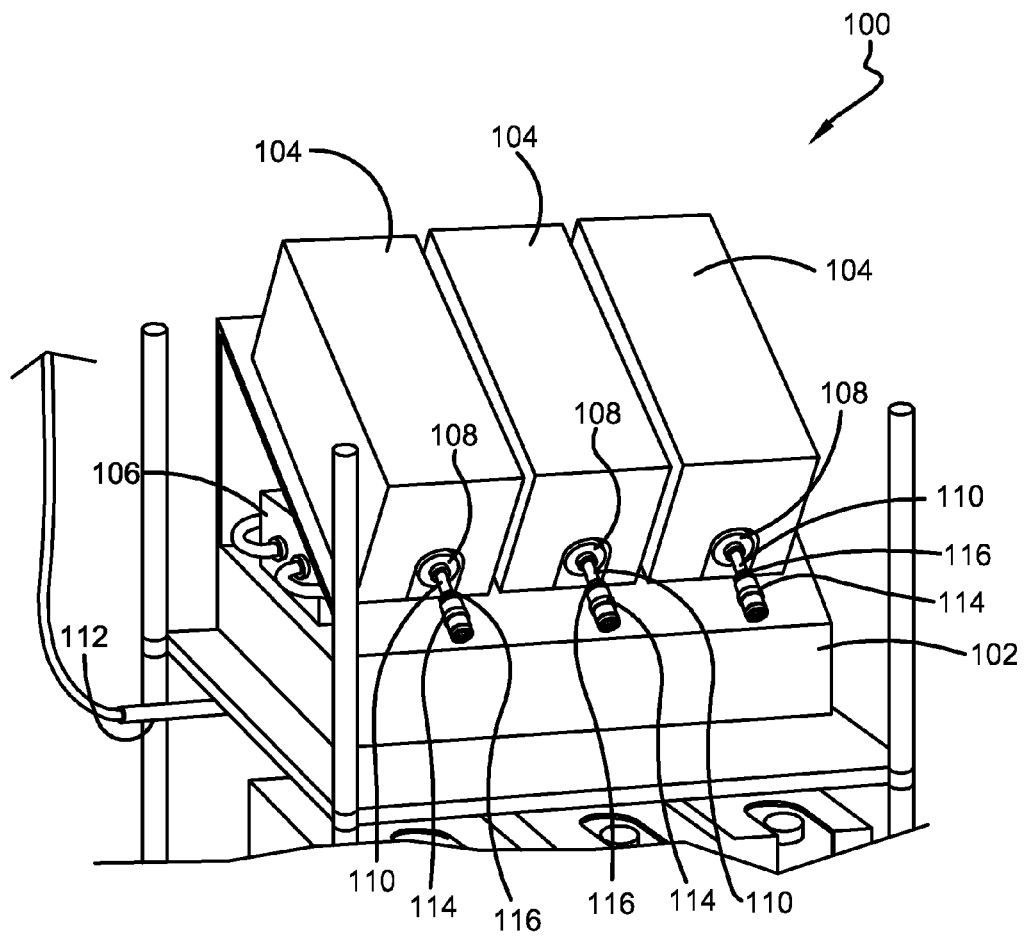
FIG. 1 illustrates a perspective view of a fresh cooking oil dispensing device.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The health and safety issues and waste with boxed cooking oil are numerous in a restaurant. For example, there are issues with carrying and slipping with a 35 lb. box of oil and the potential for a burn accident is very probable. Further, the amount of oil residue can be very high because a typical worker does not want to stand over the fryer, waiting for the oil residue to trickle down the sides of the container and completely emptying it out. On average every box of oil used in a restaurant has at least 1 lb. of oil left in the container as residue. An automated system for dispensing fresh cooking oil would give a user numerous safety and cost savings.

Accordingly, the disclosed dispensing device provides for dispensing fresh cooking oil without having to carry or pour a 35 lb. box of cooking oil. The dispensing device also aids in removing residual oil left in the container and ensures that all oil is completely drained from the container. The dispensing device comprises a rack and a vacuum chamber that holds containers of cooking oil in an inverted position. The vacuum chamber allows the cooking oil to drain out of the container and ensures that all oil is completely drained from the container. A metal cap assembly is secured to an opening of the container, allowing the container to be inverted on the rack and preventing vacuum levels from building up in the container. A hose transfers cooking oil from the container to the vacuum chamber, to the pumping station, and ultimately to a fryer. Thus, fresh cooking oil is completely drained from a container and automatically pumped into a fryer as needed without any of the typical safety and cost concerns.

Referring initially to the drawings, FIG. 1 illustrates a fresh cooking oil dispensing device 100. The dispensing device 100 comprises a rack 102 for holding at least one container of cooking oil 104. The container of cooking oil 104 is typically the standard 35 lb. box with a poly container holding the cooking oil inside the box. Typically, the rack 102 will hold at least three or four containers of cooking oil 104. The rack 102 contains a vacuum chamber 106 that facilitates removing the cooking oil from the container 104. The vacuum chamber 106 holds multiple containers of cooking oil 104 in an inverted position and allows the cooking oil to drain out of the container 104 and into the vacuum chamber 106. The vacuum chamber 106 aids in removing any residual oil left in the container 104 and ensures that all oil is completely drained from the container 104.

Furthermore, a metal cap with a seal 108 is secured to an opening of the cooking oil container 104. Once a container 104 is opened, the container 104 is re-sealed with the metal cap 108, allowing the container 104 to be inverted on the rack 102. A hose or pipe 110 connects to the metal cap 108 on the outside of the container 104, and transfers cooking oil from the container 104 to the vacuum chamber 106 in the rack 102. Quick connect fittings 114 and 116 are attached to the hose 110 for connecting the container 104 to the vacuum chamber 106. Specifically, a female fitting 114 is connected to the vacuum chamber 106 in the rack 102 and a male fitting 116 is connected to the hose 110 for completing flow of cooking oil from the container 104 to the vacuum chamber 106. An exit hose 112 connects to the vacuum chamber 106 for transferring cooking oil from the vacuum chamber 106 to a fryer (not shown).

Figure 2:
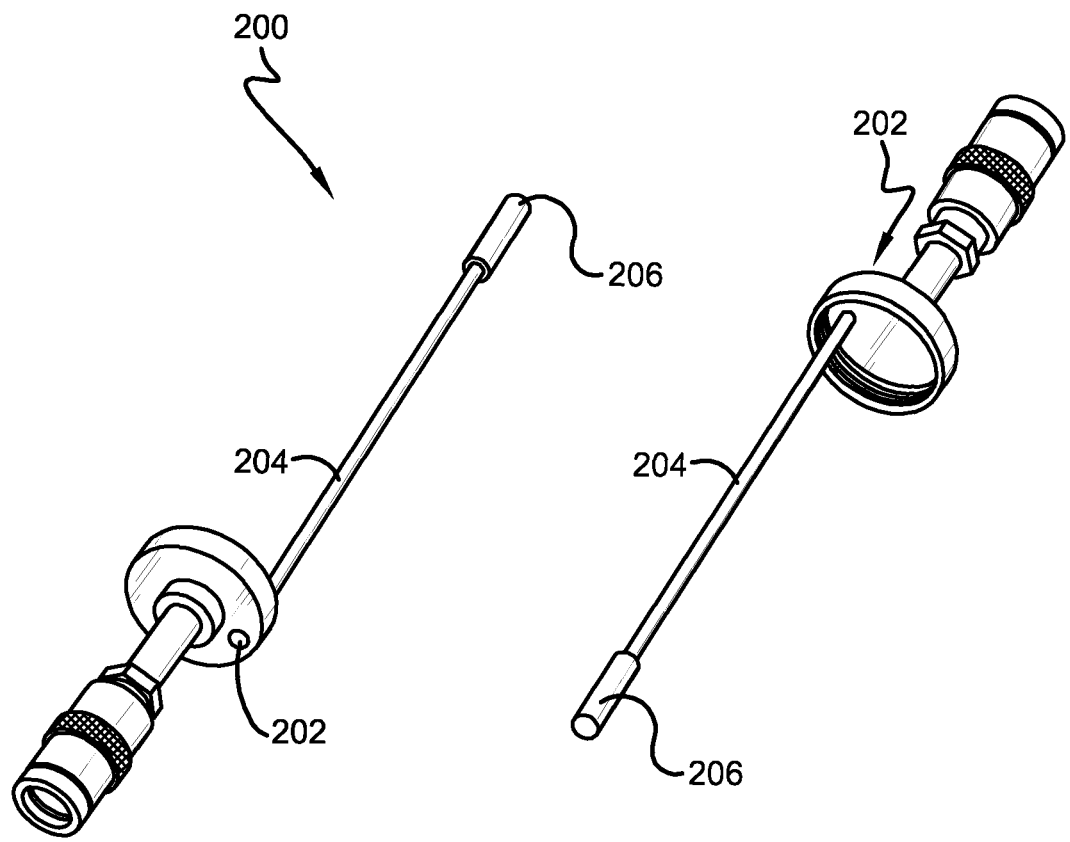
FIG. 2 illustrates a perspective view of a metal cap assembly of the cooking oil dispensing device.

In more detail, FIG. 2 illustrates a metal cap assembly 200 of the cooking oil dispensing device. Once a container of cooking oil is opened, the container is closed and re-sealed with the metal cap assembly 200 allowing the container to be inverted on the rack. The metal cap assembly 200 comprises a vent hole 202 that allows for air to enter the container of cooking oil and ensures that all oil will drain out of the container. A metal tube 204 is then connected to the vent hole 202 in the metal cap assembly 200. The tube 204 is typically a metal tube, but can be constructed of any suitable material. The tube 204 allows for air to enter the top part of the inverted container to prevent vacuum levels from building up in the container. Further, as the container collapses from the vacuum levels created, the metal tube 204 draws air in to assist in the structural integrity of the container, by keeping the container height in tact. A pressure relief device 206 is connected to the metal tube 204. The pressure relief device 206 allows air to enter automatically when the container reaches a predetermined vacuum level. The predetermined vacuum level is controlled by the user in daily operation of the dispensing device. Accordingly, the metal cap assembly 200 acts to allow for air to enter the container of oil and ensures all oil will drain out.

Figure 3:
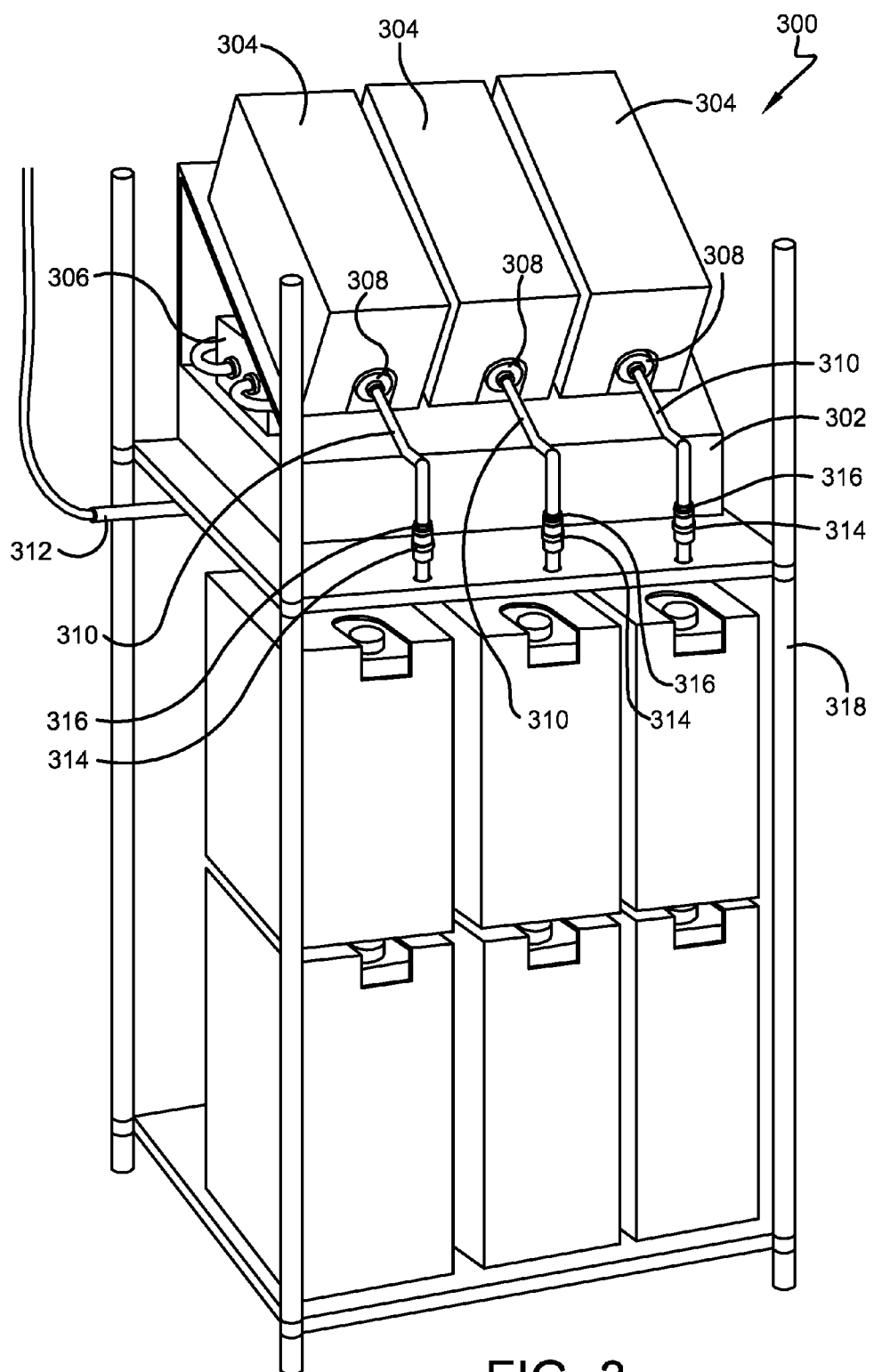
FIG. 3 illustrates a perspective view of the fresh cooking oil dispensing device used in connection with a standard wire storage rack.

Furthermore, FIG. 3 illustrates the fresh cooking oil dispensing device used in connection with a standard wire storage rack. The dispensing device 300 comprises a rack 302 for holding at least one container of cooking oil 304. Typically, the rack 302 will hold at least three or four containers of cooking oil 304 and is designed to fit a standard 24" deep wire storage rack 318 normally used to store containers of oil. Standard widths of the rack 302 and 318 are 36" for a three container rack or 48" for a four container rack. However, multiple racks 302 and 318 can be linked together to have unlimited capacity. The rack 302 contains a vacuum chamber 306 that holds multiple containers of cooking oil 304 in an inverted position. The vacuum chamber 306 allows the cooking oil to drain out of the container 304 and into the vacuum chamber 306. The vacuum chamber 306 aids in removing residual oil left in the container 304 and ensures that all oil is completely drained from the container 304.

Furthermore, a metal cap with a seal 308 is secured to an opening of the cooking oil container 304. Once a container 304 is opened, the container 304 is re-sealed with the metal cap 308, allowing the container 304 to be inverted on the rack 302. A hose or pipe 310 connects to the metal cap 308 for transferring cooking oil from the container 304 to the vacuum chamber 306 in the rack 302. Quick connect fittings 314 and 316 are attached to the hose 310 for connecting the container 304 to the vacuum chamber 306. Specifically, a female fitting 314 is connected to the vacuum chamber 306 in the rack 302 and a male fitting 316 is connected to the hose 310 for completing flow of cooking oil from the container 304 to the vacuum chamber 306. An exit hose 312 connects to the vacuum chamber 306 for transferring cooking oil from the vacuum chamber 306 to a fryer (not shown).

Figure 4:
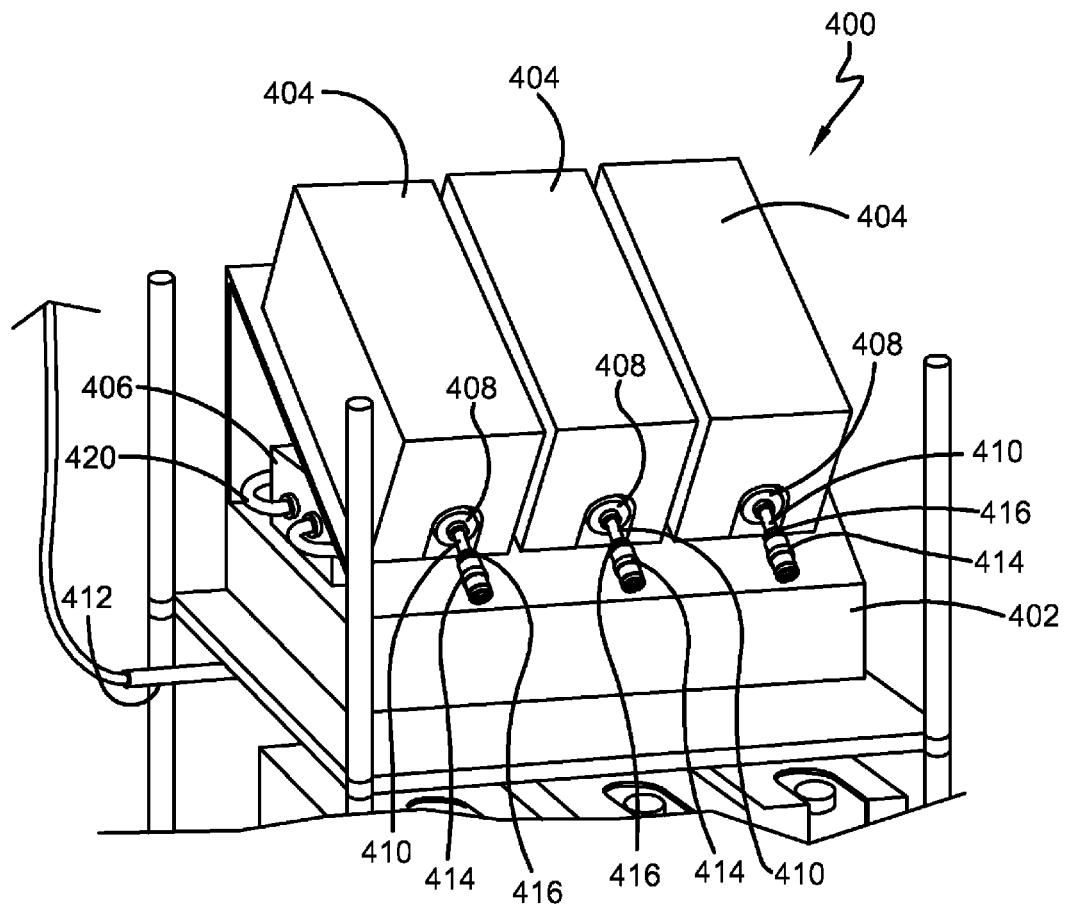
FIG. 4 illustrates a perspective view of the cooking oil dispensing device further comprising an empty container control.

FIG. 4 illustrates the fresh cooking oil dispensing device further comprising an empty container control 420. The dispensing device 400 comprises a rack 402 for holding at least one container of cooking oil 404 and a vacuum chamber 406 that secures the multiple containers of cooking oil 404 in an inverted position. The vacuum chamber 406 aids in removing residual oil left in the container 404 and ensures that all oil is completely drained from the container 404 into the vacuum chamber 406.

Furthermore, a metal cap with a seal 408 is secured to an opening of the cooking oil container 404, allowing the container 404 to be inverted on the rack 402. A hose or pipe 410 connects to the metal cap 408 for transferring cooking oil from the container 404 to the vacuum chamber 406 in the rack 402. Quick connect fittings 414 and 416 are attached to the hose 410 for connecting the container 404 to the vacuum chamber 406. An exit hose 412 connects to a pumping station (not shown) to transfer cooking oil from the vacuum chamber 406 to the pumping station and ultimately to a fryer (not shown). Further, the fresh cooking oil dispensing device 400 comprises an empty container control 420. The empty container control 420 senses when the cooking oil containers 404 are empty and alerts a user that a cooking oil container 404 is empty and should be replaced. Thus, the empty container control 420 requires empty containers of cooking oil to be removed and replaced with full, new containers 404.

Figure 5:
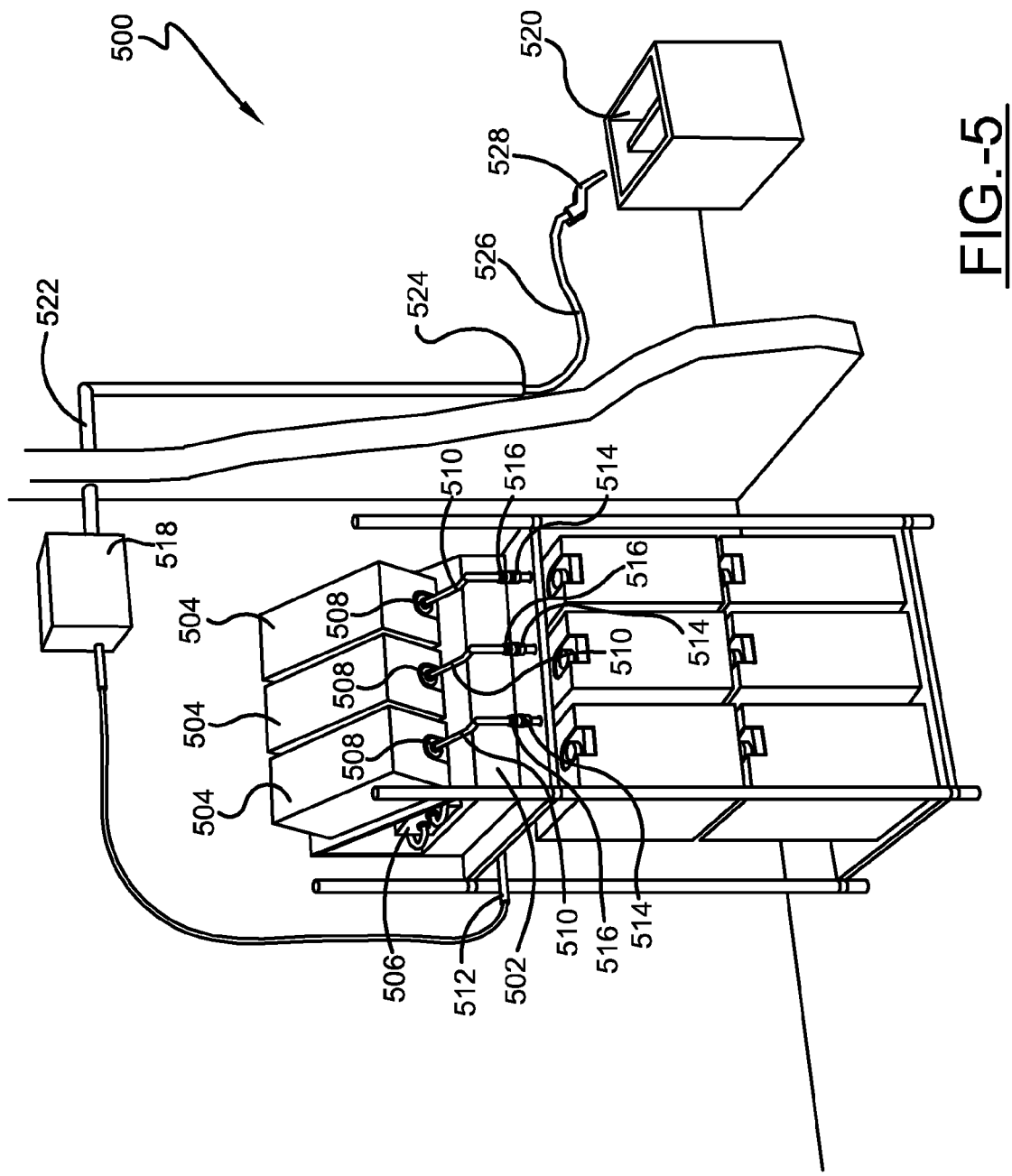
FIG. 5 illustrates a perspective view of a cooking oil dispensing system further comprising a pumping station.

Furthermore, FIG. 5 illustrates a diagram of the fresh cooking oil dispensing system further comprising a pumping station. The dispensing system 500 comprises a rack 502 for holding at least one container of cooking oil 504. Typically, the rack 502 will hold at least three or four containers of cooking oil 504. Further, the rack 502 contains a vacuum chamber 506 that secures the multiple containers of cooking oil 504 in an inverted position. The vacuum chamber 506 allows the cooking oil to drain out of the container 504 and into the vacuum chamber 506. The vacuum chamber 506 aids in removing residual oil left in the container 504 and ensures that all oil is completely drained from the container 504.

Furthermore, a metal cap with a seal 508 is secured to an opening of the cooking oil container 504, allowing the container 504 to be inverted on the rack 502. A hose or pipe 510 connects to the metal cap 508 for transferring cooking oil from the container 504 to the vacuum chamber 506 in the rack 502. Quick connect fittings 514 and 516 are attached to the hose 510 for connecting the container 504 to the vacuum chamber 506. Specifically, a female fitting 514 is connected to the vacuum chamber 506 in the rack 502 and a male fitting 516 is connected to the hose 510 for completing flow of the cooking oil from the container 504 to the vacuum chamber 506. An exit hose 512 connects to a pumping station 518 and allows for the flow of cooking oil out of the containers 504.

The exit hose 512 transfers cooking oil from the vacuum chamber 506 to the pumping station 518 and ultimately to a fryer 520. Typically, a Frontline Fresh Cooking Oil Pump Stations is used, however any suitable pumping station can be used. Specifically, oil is pumped from the pumping station 518 and transferred via a fresh oil line 522 to the fresh oil outlet 524. Once the oil reaches the fresh oil outlet 524, the oil flows through a flexible hose 526 and is dispensed via a dispensing wand 528 into a fryer 520.

Figure 6:
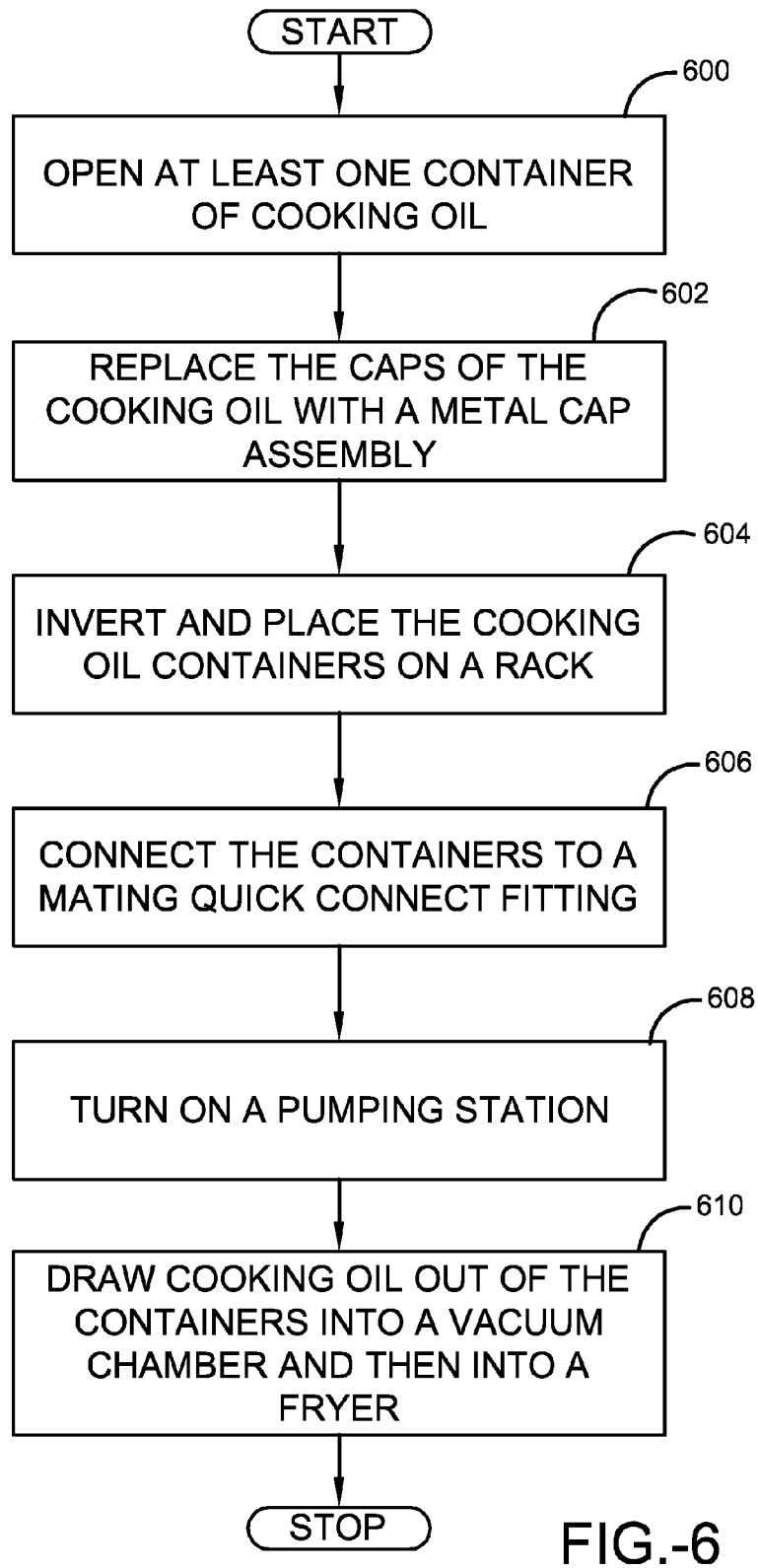
FIG. 6 illustrates a method of dispensing fresh cooking oil.

FIGS. 6-7 illustrate methodologies for dispensing fresh cooking oil, according to various aspects of the innovation. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring to FIG. 6, a method of dispensing fresh cooking oil is illustrated. At 600, at least one container of cooking oil is opened. The containers of cooking oil are typically the standard 35 lb. box with a poly container holding the cooking oil inside the box. At 602, the caps of the cooking oil containers are replaced with a metal cap assembly. The metal cap assembly comprises a vent hole and a metal tube that allows for air to enter the container of cooking oil and ensures all oil will drain out of the container. A pressure relief device is connected to the metal tube to prevent vacuum levels from building up in the container. The pressure relief device allows air to enter automatically when the container reaches a predetermined vacuum level.

And, at 604 the cooking oil containers are inverted and placed on a rack. Once a container of cooking oil is opened, the container is closed and re-sealed with the metal cap assembly, allowing the container to be inverted on the rack. Typically, the rack will hold at least three or four containers of cooking oil. Specifically, the rack is designed to fit a standard 24" deep wire storage rack normally used to store containers of oil. Standard widths of the rack are 36" for a three container rack or 48" for a four container rack. At 606, the containers are connected to a mating quick connect fitting. A hose or pipe is connected to a metal cap assembly on the outside of the container, and transfers cooking oil from the container to the vacuum chamber in the rack. Quick connect fittings are attached to the hose for connecting the container to the vacuum chamber.

At 608, a pumping station is turned on. An exit hose connects to a pumping station and transfers cooking oil from the vacuum chamber to the pumping station and ultimately to a fryer. Typically, a Frontline Fresh Cooking Oil Pump Stations is used, however any suitable pumping station can be used. And, at 610 cooking oil is drawn out of the containers into a vacuum chamber and then into a fryer. The vacuum chamber allows the cooking oil to drain out of the container and into the vacuum chamber. The vacuum chamber aids in removing residual oil left in the container and ensures that all oil is completely drained from the container.

FIG. 7 illustrates further aspects in the dispensing method of FIG. 6. At 700, air is drawn into the cooking oil containers via a vent hole to provide vacuum relief. Specifically, the metal cap assembly comprises a vent hole that allows for air to enter the container of cooking oil and ensures that all oil will drain out of the container. At 702, air is drawn into the top part of the cooking oil containers to assist in the structural integrity of the containers. A metal tube is connected to the vent hole in the metal cap assembly. The tube is typically a metal tube, but can be constructed of any suitable material. The tube allows for air to enter the top part of the inverted container to prevent vacuum levels from building up in the container. Further, as the container collapses from the vacuum levels created, the metal tube draws air in to assist in the structural integrity of the container, by keeping the container height in tact.

And at 704, air is automatically drawn into the containers when the containers reach a predetermined vacuum level. A pressure relief device is connected to the metal tube. The pressure relief device allows air to enter automatically when the container reaches a predetermined vacuum level. The predetermined vacuum level is controlled by the user in daily operation of the dispensing device. Accordingly, the metal cap assembly acts to allow for air to enter the container of oil and ensures that all oil will drain out.

At 706, a female fitting is connected to the vacuum chamber. A hose or pipe is connected to a metal cap assembly on the outside of the container, and allows for cooking oil to flow toward the vacuum chamber in the rack. Quick connect fittings are attached to the hose for connecting the container to the vacuum chamber. Specifically, a female fitting is connected to the vacuum chamber in the rack. At 708, a male fitting is connected to the hose for completing flow of the cooking oil from the containers to the vacuum chamber. At 710, an empty container control senses when the containers are empty and alerts a user. The empty container control senses when the cooking oil containers are empty and alerts a user that a cooking oil container is empty and should be replaced. Thus, the empty container control requires empty containers of cooking oil to be removed and replaced with full, new containers.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A fresh cooking oil dispensing device, comprising:
a rack for holding at least one container of cooking oil;

a vacuum chamber for removing cooking oil from the at least one container, wherein the vacuum chamber is contained within the rack and the rack also holds the at least one container in an inverted position and allows the cooking oil to drain out of the at least one container and into the vacuum chamber;

a metal cap with a seal placed on an opening of the at least one container of cooking oil, for allowing the at least one container of cooking oil to be inverted on the rack;

wherein the metal cap comprises a vent hole and a metal tube for introducing air into a top part of the at least one container and assisting in structural integrity of the at least one container;

a hose that connects to the metal cap for transferring cooking oil from the at least one container to the vacuum chamber in the rack;

an exit hose that connects to the vacuum chamber for transferring cooking oil from the vacuum chamber to a fryer; and an empty container control that senses when the at least one container is empty and alerts a user that the at least one container is empty.

2. The dispensing device of claim 1, wherein a pressure relief device is connected to the metal tube for automatically introducing air into the at least one container when the at least one container reaches a predetermined vacuum level.

3. The dispensing device of claim 1, wherein quick connect fittings are attached to the hose for connecting the at least one container to the vacuum chamber.

4. The dispensing device of claim 3, wherein the quick connect fittings comprise a male and female fitting, the female fitting is connected to the vacuum chamber in the rack and the male fitting is connected to the hose for completing flow of cooking oil from the at least one container to the vacuum chamber.

5. The dispensing device of claim 1, wherein the exit hose transfers cooking oil from the vacuum chamber to a pumping station and then to the fryer.

6. The dispensing device of claim 1, wherein the rack is sized to fit on a standard 24" deep wire storage rack with a width of 36" or 48".

7. A fresh cooking oil dispensing system, comprising:

a rack for holding at least one container of cooking oil;

a vacuum chamber for removing cooking oil from the at least one container, wherein the vacuum chamber is contained within the rack and the rack also holds the at least one container in an inverted position and allows the cooking oil to drain out of the at least one container and into the vacuum chamber;

a metal cap assembly is placed on an opening of the at least one container of cooking oil, for allowing the at least one container of cooking oil to be inverted on the rack;

wherein the metal cap comprises a vent hole and a metal tube for introducing air into a top part of the at least one container and assisting in structural integrity of the at least one container;

a hose that connects to the metal cap for transferring cooking oil from the at least one container to the vacuum chamber in the rack;

a pump station for pumping cooking oil out of the vacuum chamber and into a fryer;

an exit hose that connects to the pumping station for transferring cooking oil from the vacuum chamber to the pumping station and then to the fryer; and an empty container control that senses when the at least one container is empty and alerts a user that the at least one container is empty.

8. The system of claim 7, wherein a pressure relief device is connected to the metal tube for automatically introducing air into the at least one container when the at least one container reaches a predetermined vacuum level.

* * * * *